(12) United States Patent
Schnabel

(10) Patent No.: US 10,587,397 B2
(45) Date of Patent: Mar. 10, 2020

(54) STORAGE MEDIUM ENTERPRISE AND BLOCK CHAIN ENABLED COMMUNICATION

(71) Applicant: Seagate Technology LLC, Cupertino, CA (US)

(72) Inventor: Dieter Paul Schnabel, Erie, CO (US)

(73) Assignee: Seagate Technology LLC, Cupertino, CA (US)

( * ) Notice: Subject to any disclaimer, the term of this patent is extended or adjusted under 35 U.S.C. 154(b) by 272 days.

(21) Appl. No.: 15/895,871

(22) Filed: Feb. 13, 2018

(65) Prior Publication Data

US 2019/0253238 A1    Aug. 15, 2019

(51) Int. Cl.
*H04L 9/32* (2006.01)
*G06F 12/14* (2006.01)
*H04L 9/06* (2006.01)
*G06F 21/60* (2013.01)

(52) U.S. Cl.
CPC .......... *H04L 9/0637* (2013.01); *G06F 21/602* (2013.01)

(58) Field of Classification Search
CPC ......... G06F 12/1408; G06F 2212/1052; G06F 21/79; H04L 9/0894; H04L 9/0861
USPC ....................................................... 713/193
See application file for complete search history.

(56) References Cited

U.S. PATENT DOCUMENTS

| | | | |
|---|---|---|---|
| 9,667,427 B2 | 5/2017 | Oberhauser et al. | |
| 9,749,140 B2 | 8/2017 | Oberhauser et al. | |
| 10,481,205 B2 * | 11/2019 | Bhagwat | G01R 31/2851 |
| 2011/0035813 A1 * | 2/2011 | Trantham | G06F 21/78 726/34 |
| 2012/0158554 A1 * | 6/2012 | Shafiee | G06Q 10/06 705/29 |
| 2012/0158596 A1 * | 6/2012 | Shafiee | G06Q 10/103 705/301 |
| 2012/0158645 A1 * | 6/2012 | Shafiee | G06Q 10/06 707/607 |
| 2012/0159494 A1 * | 6/2012 | Shafiee | G06F 9/5038 718/102 |
| 2015/0039891 A1 * | 2/2015 | Ignatchenko | G06F 21/575 713/171 |
| 2015/0293857 A1 * | 10/2015 | Cope | G06F 21/79 713/193 |

(Continued)

*Primary Examiner* — Haresh N Patel
(74) *Attorney, Agent, or Firm* — Hall Estill Attorneys at Law

(57) ABSTRACT

A system includes a storage medium enterprise and a processing component. The storage medium enterprise includes a first storage medium configured to store data and a second storage medium configured to store data. The processing component external to the storage medium enterprise is configured to receive and process data received from the storage medium enterprise. The first storage medium is configured to transmit a first operational data associated with the first storage medium to the processing component and the second storage medium is configured to transmit a second operational data associated with the second storage medium to the processing component. The first operational data is formed into a block of a block chain prior to transmission to the processing medium and the second operational data is formed into another block of the block chain prior to transmission to the processing medium.

23 Claims, 6 Drawing Sheets

(56) References Cited

U.S. PATENT DOCUMENTS

| | | | |
|---|---|---|---|
| 2016/0041768 A1* | 2/2016 | Riahi | G06F 3/0608 |
| | | | 711/166 |
| 2016/0042176 A1* | 2/2016 | Riahi | G08B 5/36 |
| | | | 340/691.6 |
| 2017/0111175 A1 | 4/2017 | Oberhauser et al. | |
| 2017/0140145 A1 | 5/2017 | Shah | |
| 2017/0222814 A1 | 8/2017 | Oberhauser et al. | |
| 2017/0243193 A1 | 8/2017 | Manian et al. | |
| 2017/0264428 A1 | 9/2017 | Seger, II | |
| 2017/0293669 A1 | 10/2017 | Madhavan et al. | |
| 2017/0295023 A1 | 10/2017 | Madhavan et al. | |
| 2017/0352027 A1 | 12/2017 | Zhang et al. | |
| 2018/0019876 A1* | 1/2018 | Moss | G06F 21/64 |
| 2018/0212942 A1* | 7/2018 | Lindquist | H04L 63/062 |
| 2018/0241871 A1* | 8/2018 | Sarafa | H04M 1/72552 |
| 2019/0065733 A1* | 2/2019 | Forehand | G06F 21/445 |
| 2019/0253238 A1* | 8/2019 | Schnabel | H04L 9/3239 |
| 2019/0354610 A1* | 11/2019 | Schnabel | H04L 9/0891 |

* cited by examiner

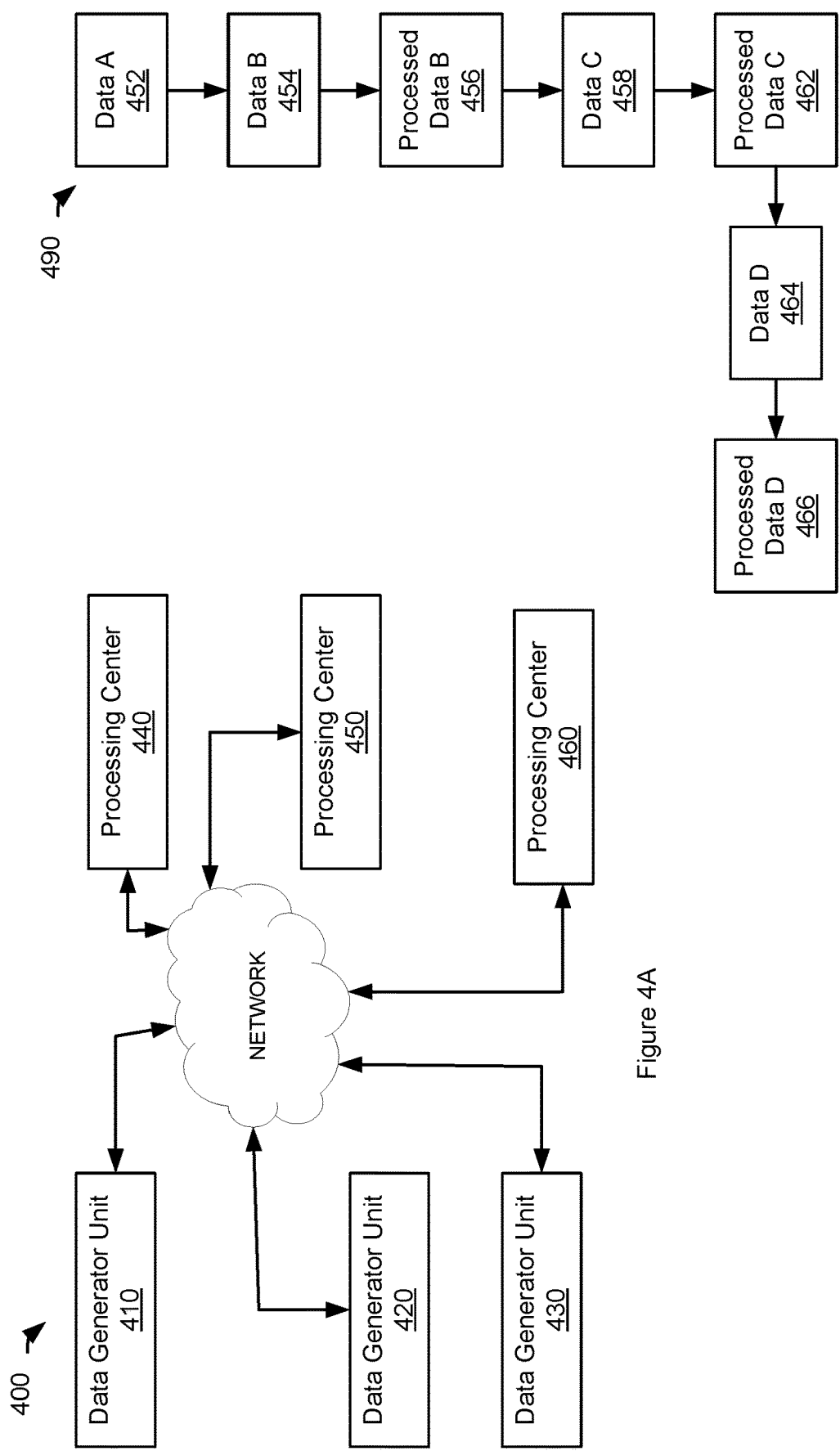

STORAGE MEDIUM ENTERPRISE AND BLOCK CHAIN ENABLED COMMUNICATION

SUMMARY

Provided herein is a system that includes a storage medium enterprise and a processing component. The storage medium enterprise includes a first storage medium configured to store data and a second storage medium configured to store data. The processing component external to the storage medium enterprise is configured to receive and process data received from the storage medium enterprise. The first storage medium is configured to transmit a first operational data associated with the first storage medium to the processing component and the second storage medium is configured to transmit a second operational data associated with the second storage medium to the processing component. The first operational data is formed into a block of a block chain prior to transmission to the processing medium and the second operational data is formed into another block of the block chain prior to transmission to the processing medium.

These and other features and advantages will be apparent from a reading of the following detailed description.

BRIEF DESCRIPTION OF DRAWINGS

FIGS. 4A-4B show an exemplary communication between a storage medium enterprise system and a processing center and a block chain resulting therefrom according to one aspect of the present embodiments.

DESCRIPTION

Figure 1:
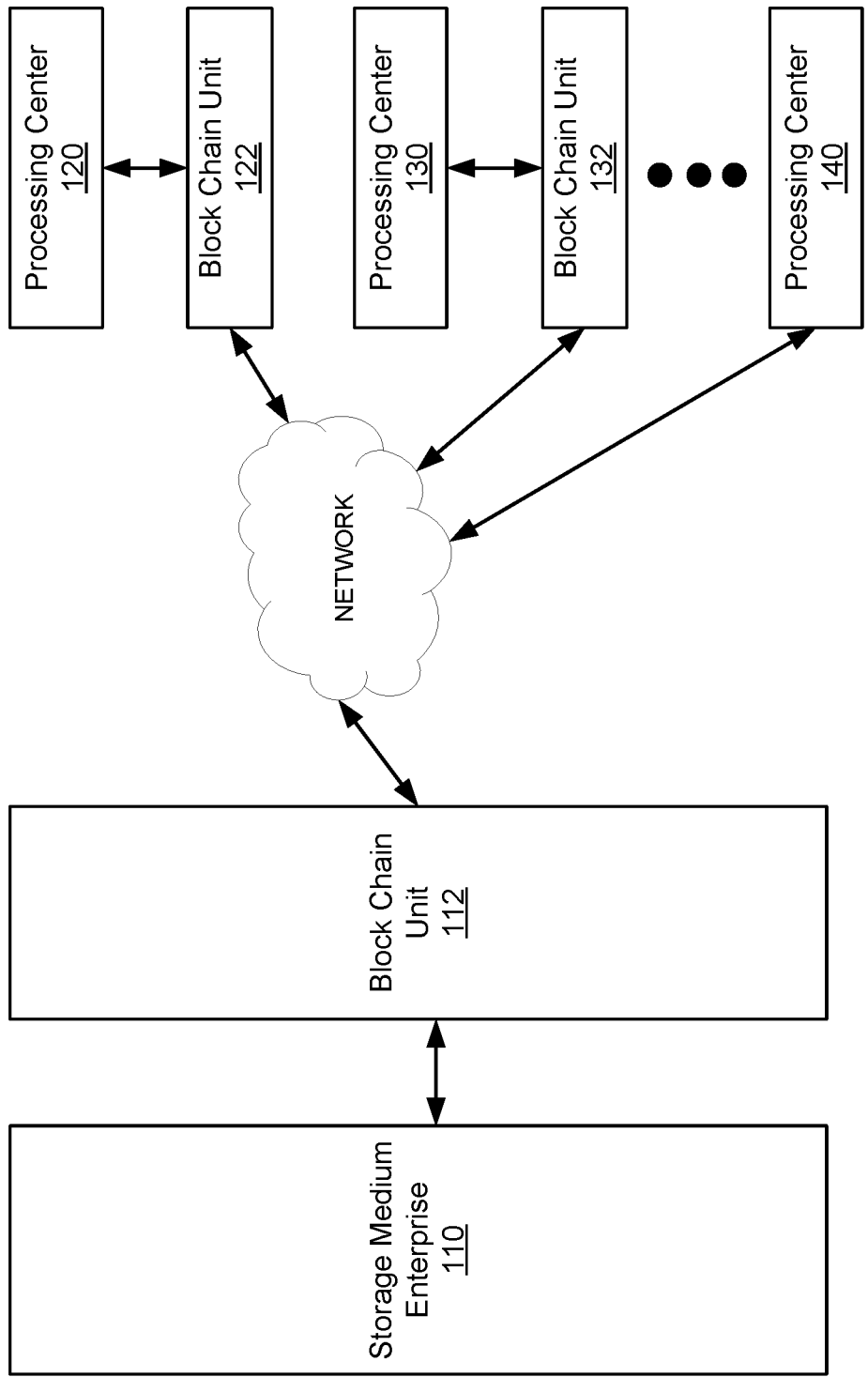
FIG. 1 shows a storage medium enterprise system according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device or a processor. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "decrypting," "encrypting," "processing," "updating," "instantiating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Storage medium enterprise systems may be configured by a system administrator. The storage medium enterprise system may include one or more hard drives and/or one or more solid state drives. In order to configure the enterprise system, the administrator may be asked to provide certain private information, e.g., name, email address, media access control (MAC) address, Internet Protocol (IP) address, etc. Furthermore, the storage medium enterprise may transmit certain operational information associated with the storage medium enterprise system, e.g., debug log files in response to occurrence of an event, debug data, telemetry stream of data in regular intervals, etc. to a processing center, e.g., manufacturer of the storage medium enterprise system. The operational information may include certain data associated with the operation of the storage medium enterprise system, e.g., data indicating that a hard drive is about to fail, data regarding utilization of a hard drive and/or solid state drive, data regarding bandwidth of a hard drive and/or solid state drive, data regarding storage capacity of a hard drive and/or solid state drive, number of reads, number of writes, head failures, drive failure responsive to occurrence of a requested service action, etc.

Growing concerns over data and privacy have increased the importance of protecting and tracking the data being transmitted from the storage medium enterprise system to one or more processing centers. In some embodiments, a block chain technology may be utilized to encrypt the operational data and/or the private information being transmitted from the storage medium enterprise system to a processing center. Moreover, encrypting the processed data by the processing center and further encrypting the processed data prior to transmission to other entities, e.g., other processing centers, the storage medium enterprise system, etc. may be desired. Block chain may be shared with various nodes within the network, e.g., a storage medium enterprise system, one or more processing entities, etc., in a cryptographically secure manner. According to some embodiments, new data may be encrypted and appended to the end of the block chain and prevent prior data within the block chain from being modified. As such, any data generated or processed, whether public/private, can be tracked and cannot be modified without breaking the block chain. Thus, access to data can be revoked and implemented efficiently if the data owner, e.g., customer, system administrator, etc., wishes to revoke access to data because the data is tracked using the block chain technology. Furthermore, in some embodiments a layered block chain may be used where more sensitive data, e.g., private information, may be encrypted in such a fashion that the data is not visible to public or an unauthorized user while encrypting non sensitive data, e.g., operational data of the storage medium enterprise system, in such as fashion that makes the data visible to public.

It is appreciated that throughout the application references are going to be made to data in general and the need to encrypt the data. However, it is appreciated that the references to data is for private data of the system administrator that is used to configure the storage medium enterprise system and/or operational data associated with the storage medium enterprise system. Accordingly, access to data whether private or public may be revoked at any time by the owner of the data since access to data can be tracked using block chain technology.

Referring now to FIG. 1, a storage medium enterprise system according to one aspect of the present embodiments is shown. The system 100 includes a storage medium enterprise 110, a block chain unit 112, processing centers 120, 130, and 140 and block chain units 122 and 132. It is appreciated that the block chain units are components that encrypt the data with block chain technology. For example, the block chain unit 112 coupled to the storage medium enterprise 110 is configured to encrypt data from the storage medium enterprise 110 based on a block chain technology.

The storage medium enterprise 110 may include one or more hard drives and/or one or more solid state drives. Storage medium enterprise 110 is configured by a system administrator. In order to configure the storage medium enterprise 110 the administrator may be asked to provide certain private information, e.g., name, email address, media access control (MAC) address, Internet Protocol (IP) address, etc. Furthermore, the storage medium enterprise 110 may generate certain operational information associated with the storage medium enterprise 110, e.g., debug log files, debug data, telemetry stream of data in regular intervals, etc. It is appreciated that the generation of the operational information may be in response to occurrence of a certain event or it may be generated automatically in frequent intervals. For example, the operational information may be generated when a certain event occurs, e.g., utilization of the storage medium exceeds a certain threshold, indication that a drive is about to fail, number of reads exceeds a certain threshold, number writes exceeds a certain threshold, a predetermined amount of time has passed, a certain amount of capacity has been utilized, etc. It is appreciated that the operational data may include information associated with the operation of the storage medium enterprise 110, e.g., data indicating that a hard drive within the storage medium enterprise 110 is about to fail, data regarding utilization of a hard drive and/or solid state drive within the storage medium enterprise 110, data regarding bandwidth of a hard drive and/or solid state drive within the storage medium enterprise 110, data regarding storage capacity of a hard drive and/or solid state drive within the storage medium enterprise 110, number of reads of a drive within the storage medium enterprise 110, number of writes of a drive within the storage medium enterprise 110, head failures of a drive within the storage medium enterprise 110, drive failure responsive to occurrence of a requested service action within the storage medium enterprise 110, etc.

Operational data generated by the storage medium enterprise 110 is encrypted in a cryptographically secure manner via the block chain unit 112, using a block chain technology. Moreover, the block chain unit 112 may encrypt the private information of the administrator of the storage medium enterprise 110 in a cryptographically secure manner. According to some embodiments, a layered block chain may be used where a more sensitive data, e.g., private information, may be encrypted in such a fashion that the data is not visible to public or unauthorized user while encrypting non-sensitive data, e.g., operational data of the storage medium enterprise system, in such as fashion that makes the data visible to public. For example, a cryptographic one-way function, e.g., hash function, password-based key derivation function 2, pseudorandom function such as SHA256, etc., may be used to encrypt the private information such that the content of the private information is kept private even if the block chain is made public. In some embodiments, the proof and/or meta data associated with the private information may be included in the attestation for the block chain but not the actual content of the private information itself such that when published the private information is kept private. It is appreciated that in some embodiments, the storage medium enterprise 110 and the block chain unit 112 may be within an integrated unit.

The data once encrypted is appended to the end of the block chain and prior data within the block chain is prevented from being modified without breaking the block chain. It is appreciated that the block chain unit 112 may initially use a hardware root key in order to instantiate the block chain. The hardware root key is a unique key for each component, e.g., a hard drive, a solid state drive, etc.

In some embodiments, the block chain data is transmitted from the block chain unit 112 to the processing center 120. The processing center 120 may be an entity that services and/or manufactured the storage medium enterprise 110. The processing center 120 may access the block chain and process the data, e.g., private data, operational data, etc. as long as the processing center 120 is authorized to do so. For example, the processing center 120 may decrypt the encrypted data, if authorized to do so, in order to process the data. It is appreciated that a permissioned block chain may be used in order to control access to the network, and therefore the block chain. The processed data by the processing center 120 may be transmitted to the block chain unit 122 to be encrypted as a block within the block chain. It is appreciated that in some embodiments, the processing center 120 and the block chain unit 122 may be within an integrated unit. The processed data may be encrypted using the block chain unit 122 similar to the operation of the block chain unit 112. It is appreciated that the newly added block of the block chain may be propagated to all the nodes in order to update the block chain at each node. For example, the block added to the block chain by the block chain unit 122 may be propagated to the storage medium enterprise 110 and the block chain unit 112. Similarly, the block added to the block chain by the block chain unit 122 may be propagated to the processing centers 130, 140, etc.

In some embodiments, the block chain may be used by other nodes. For example, the block chain may be used by the processing center 130 for further processing. It is appreciated that the processing center 130 may be an entity that services and/or manufactured the storage medium enterprise 110. The processing center 130 may access the block chain and process the data, e.g., private data, operational data, etc. as long as the processing center 130 is authorized to do so. It is appreciated that a permissioned block chain may be used in order to control access to the network, and therefore the block chain. For example, the processing center 130 may decrypt the encrypted data, if authorized to do so, in order to process the data. The processed data by the processing center 130 may be transmitted to the block chain unit 132 to be encrypted as a block within the block chain. It is appreciated that in some embodiments, the processing center 130 and the block chain unit 132 may be within an integrated unit. The processed data may be encrypted using the block chain unit 132 similar to the operation of the block chain unit 112. It is appreciated that the newly added block of the block chain may be propagated to all the nodes in order to update the block chain at each node.

It is appreciated that more data may be generated by the storage medium enterprise 110 and may be appended as a block of the block chain, as described above. The appended block and the updated block chain is propagated to other nodes.

Accordingly, a block chain is created for private data and/or the operational data associated with the storage medium enterprise 110 and processed data thereof. The block chain grows over time as more data is created and/or processed. The blocks of the block chain are linked in a secure fashion using cryptography and may contain a hash pointer as a link to its previous block, a timestamp, and the data. It is appreciated that in some embodiments, data, e.g., private data, operational data, processed data, etc. may be hashed and encoded into a Merkle tree. As such, each block may include a hash of its prior block in the block chain, thereby linking the two blocks. Thus, the integrity of previous blocks may be confirmed. Moreover, access to data may be controlled and tracked. As such, access to data may be revoked by the system administrator since every entity that has access to the data can be tracked using block chain.

Figure 2:
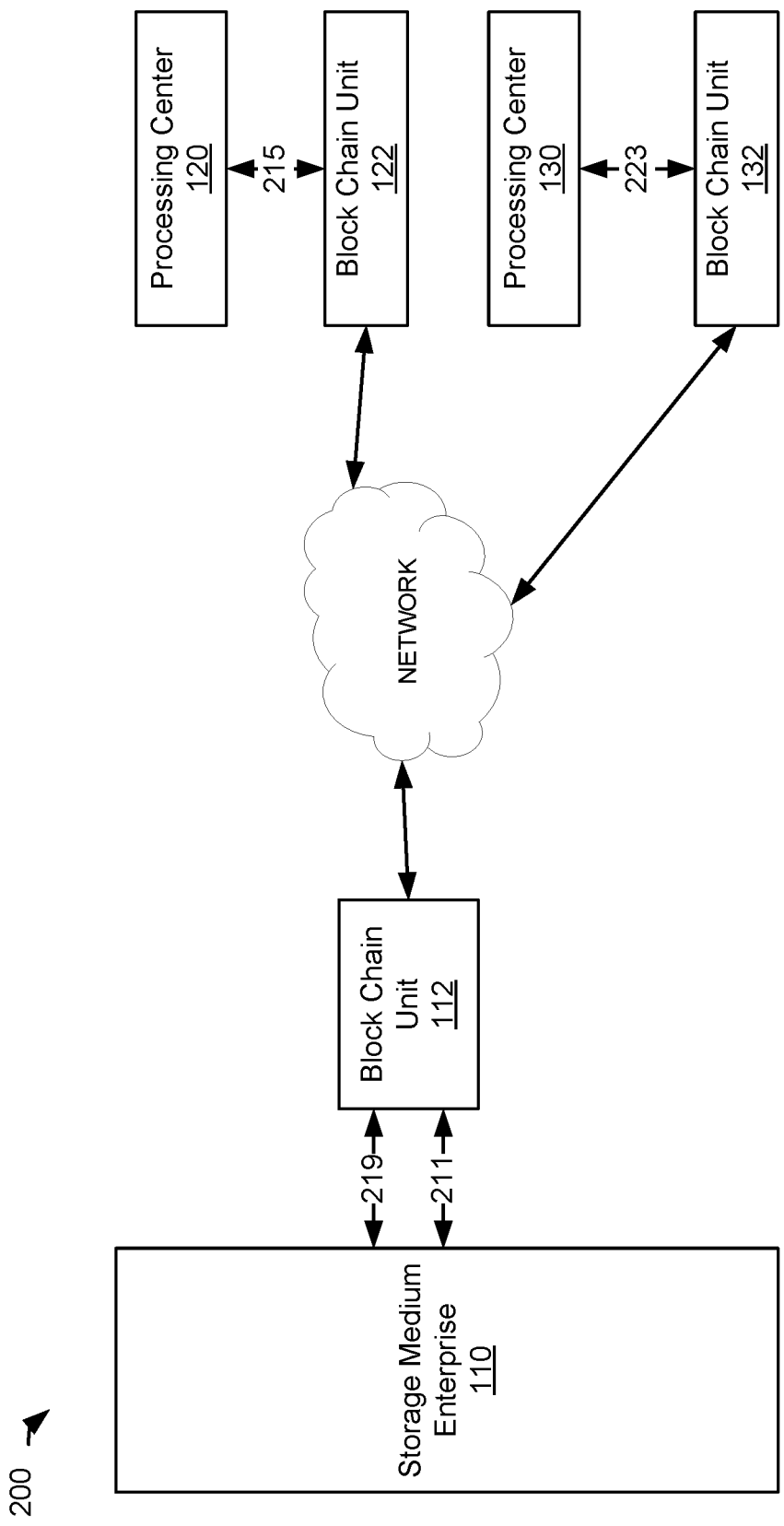
FIG. 2 shows an exemplary communication between a storage medium enterprise system and a processing center according to one aspect of the present embodiments.

Referring now to FIG. 2, an exemplary communication between a storage medium enterprise system and a processing center according to one aspect of the present embodiments is shown. System 200 includes the storage medium enterprise 110, the block chain unit 112, the processing center 120, the block chain unit 122, the processing center 130, and the block chain unit 132. It is appreciated that the storage medium enterprise 110, the block chain unit 112, the processing centers 120-130 and the block chains 122 and 132 operate substantially similar to those described in FIG. 1. In this example, the storage medium enterprise 110, at time $t_0$, transmits data 211 to the block chain unit 112. The data may include operational data associated with the storage medium enterprise 110 and/or private data associated with the administrator of the storage medium enterprise 110. The data may be encrypted and inserted as a block to a block chain using the block chain unit 112 to form a first block chain. The block chain is then updated throughout the nodes within the network with the first block chain. For example, the block chain is updated for the processing centers 120 and 130 with the first block chain.

At time $t_1$, that data in the first block chain may be used by the processing unit 120 for processing. The processing center 120 may process the data, if it is authorized to do so. The processed data may be transmitted at time $t_2$ to the block chain unit 122 to generate a block based on the processed data. The block chain may be updated to form a second block chain based on the block generated by the block chain unit 122 which includes the encrypted processed data. The block chain may be updated throughout the nodes within the network.

At time $t_3$ the storage medium enterprise 110 may generate additional data, e.g., additional operational data. The additional operational data may be transmitted 219 to the block chain unit 112. The block chain 112 may encrypt the newly generated data and append it as a new block to the block chain, at time $t_4$ to form a third block chain. The block chain is then updated throughout the nodes of the network.

The processing center 130 may process the data, if it is authorized to do so. The processed data may be transmitted at time $t_5$ to the block chain unit 132 to generate a block based on the processed data to form a fourth block chain. The block chain may be updated based on the block generated by the block chain unit 132 which includes the encrypted processed data. The block chain may be updated throughout the nodes within the network.

It is appreciated that the processing center 120 may process the data, if it is authorized to do so, at time $t_6$. The processed data may be transmitted 219 at time $t_7$ to the block chain unit 122 to generate a block based on the processed data to form a fifth block chain. The block chain may be updated based on the block generated by the block chain unit 122 which includes the encrypted processed data. The block chain may be updated throughout the nodes within the network.

It is appreciated that the processing center 130 may process the data, if it is authorized to do so, at time $t_8$. The processed data may be transmitted at time $t_9$ to the block chain unit 132 to generate a block based on the processed data to form a sixth block chain. The block chain may be updated based on the block generated by the block chain unit 132 which includes the encrypted processed data. The block chain may be updated throughout the nodes within the network.

It is appreciated that the first block chain, the second block chain, the third block chain, the fourth block chain, the fifth block chain, and the sixth block chain refer to the same block chain that has been updated with new blocks as new data has been appended as a new block.

Figure 3:
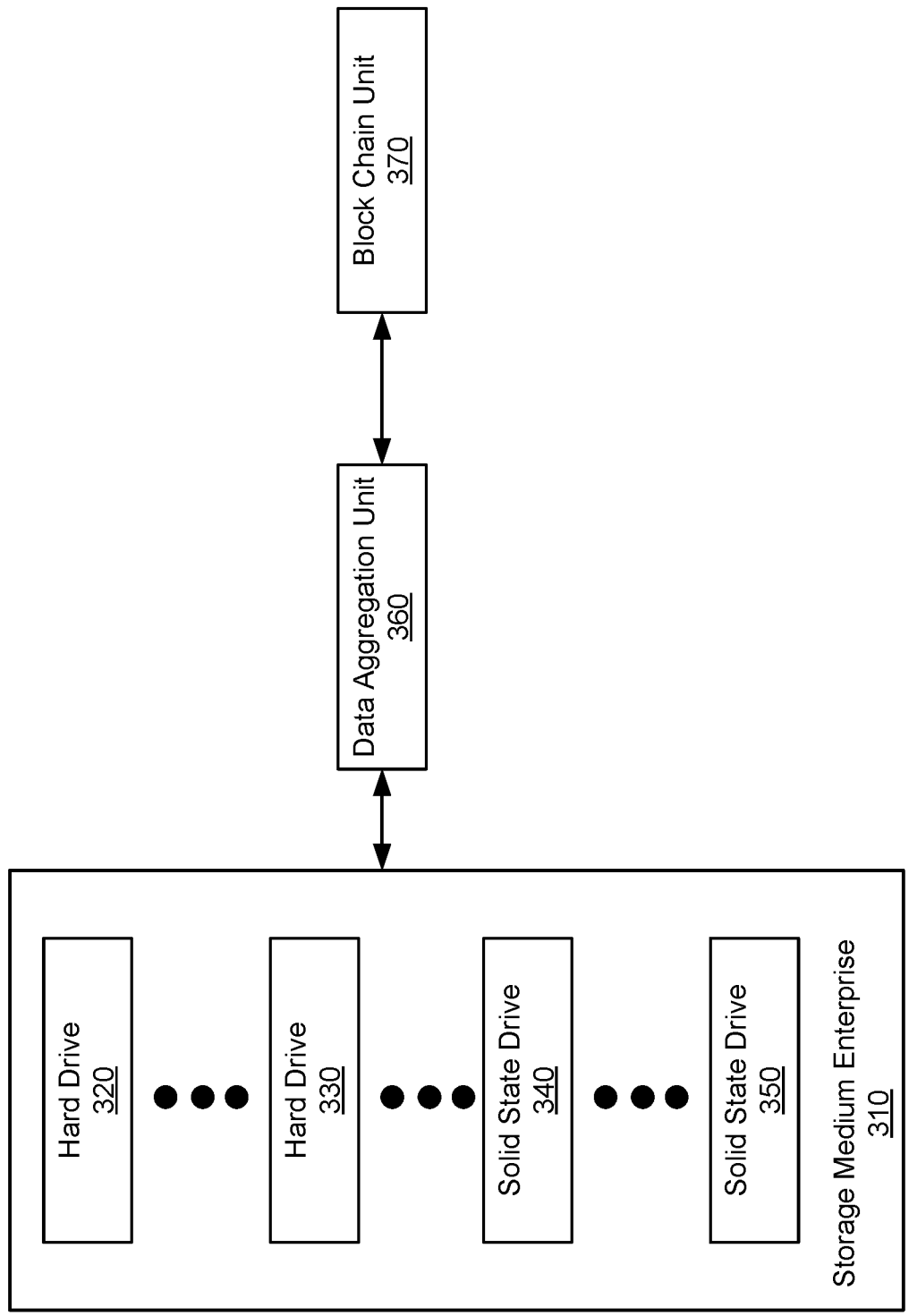
FIG. 3 shows a storage medium enterprise system according to one aspect of the present embodiments.

Referring now to FIG. 3, a storage medium enterprise system according to one aspect of the present embodiments is shown. The storage medium enterprise 310 may be coupled to the data aggregation unit 360 which is further coupled to the block chain unit 370. It is appreciated that the storage medium enterprise 310 may be similar to that of FIGS. 1 and 2. Moreover, the block chain unit 370 may be similar to those described in FIGS. 1 and 2.

In this embodiment, the storage medium enterprise 310 may include a plurality of hard drives 320, . . . , 330 and a plurality of solid state drives 340, . . . , 350. Operational data generated by each drive and/or the private data of the administrator may be transmitted to the data aggregation unit 360. The data aggregation unit 360 may package the data into one package and send it to the block chain unit 370 to be encrypted and be appended as a block to the block chain. It is appreciated that the data aggregation unit 360 may collect and aggregate data over a period of time, e.g., 5 minutes, 10 minutes, 1 hour, 1 day, etc. In some embodiments, the data aggregation unit 360 may package similar data together, e.g., operational data together, private data together, data from hard drives together, data from the solid state drives together, etc. It is appreciated that the data aggregation unit 360 may receive further data after the prior received data is aggregated by the data aggregation unit 360 and transmitted to the block chain unit 370 to be encrypted and appended as a block to the block chain. The additional data that is received may be similarly aggregated over time, in some embodiments, and transmitted to the block chain unit 370 for encryption in order to be added as a block to the block chain. Thus, newly received data may similarly be formed into a new block and appended to the block chain. Accordingly, the data may be tracked using the block chain technology.

Referring now to FIGS. 4A-4B, an exemplary communication between a storage medium enterprise system and a processing center and a block chain resulting therefrom according to one aspect of the present embodiments are shown. System 400 may include data generator units 410, 420, and 430, and processing centers 440, 450, and 460. The data generator units 410, 420, and 430 may be similar to the storage medium enterprise as described in FIGS. 1-3. In some embodiments, the data generator units 410, 420, and 430 may be the drives within the storage medium enterprise, as described in FIG. 3.

The data generator unit 410 may generate data at time $t_0$. The generated data is encrypted using a block chain unit (not shown but as described above) in order to generate a block, data block A 452, of a block chain data 490. In some embodiments, the data generator unit 410 may generate additional data B, at time $t_1$, that is encrypted using a block chain unit (not shown but as described above) in order to generate a block, data block B 454, of the block chain data 490. The processing center 440 may process a data, e.g., data block B 454, at time $t_2$, within the block chain data 490. The processed data B may be encrypted using a block chain unit (not shown but as described above) in order to generate a block, e.g., a processed data B 456, of the block chain 490. The data generator unit 420 may generate data, e.g., data C, at time $t_3$, which is encrypted using a block chain unit (now shown but as described above) in order to generate a block, e.g., data block C 458, of the block chain 490. The processing center 440 may process a data, e.g., data block C 458, at time $t_4$, within the block chain data 490. The processed data C may be encrypted using a block chain unit (not shown but as described above) in order to generate a block, e.g., a processed data C 462, of the block chain 490. The data generator unit 430 may generate data, e.g., data D, at time $t_5$, which is encrypted using a block chain unit (now shown but as described above) in order to generate a block, e.g., data block D 464, of the block chain 490. The processing center 460 may process a data, e.g., data block D 464, at time $t_6$, within the block chain data 490. The processed data D may be encrypted using a block chain unit (not shown but as described above) in order to generate a block, e.g., a processed data D 464, of the block chain 490. It is appreciated that at each step of generating a block of the block chain, the block chain is update and the information is propagated to every node of the network.

Figure 5A:
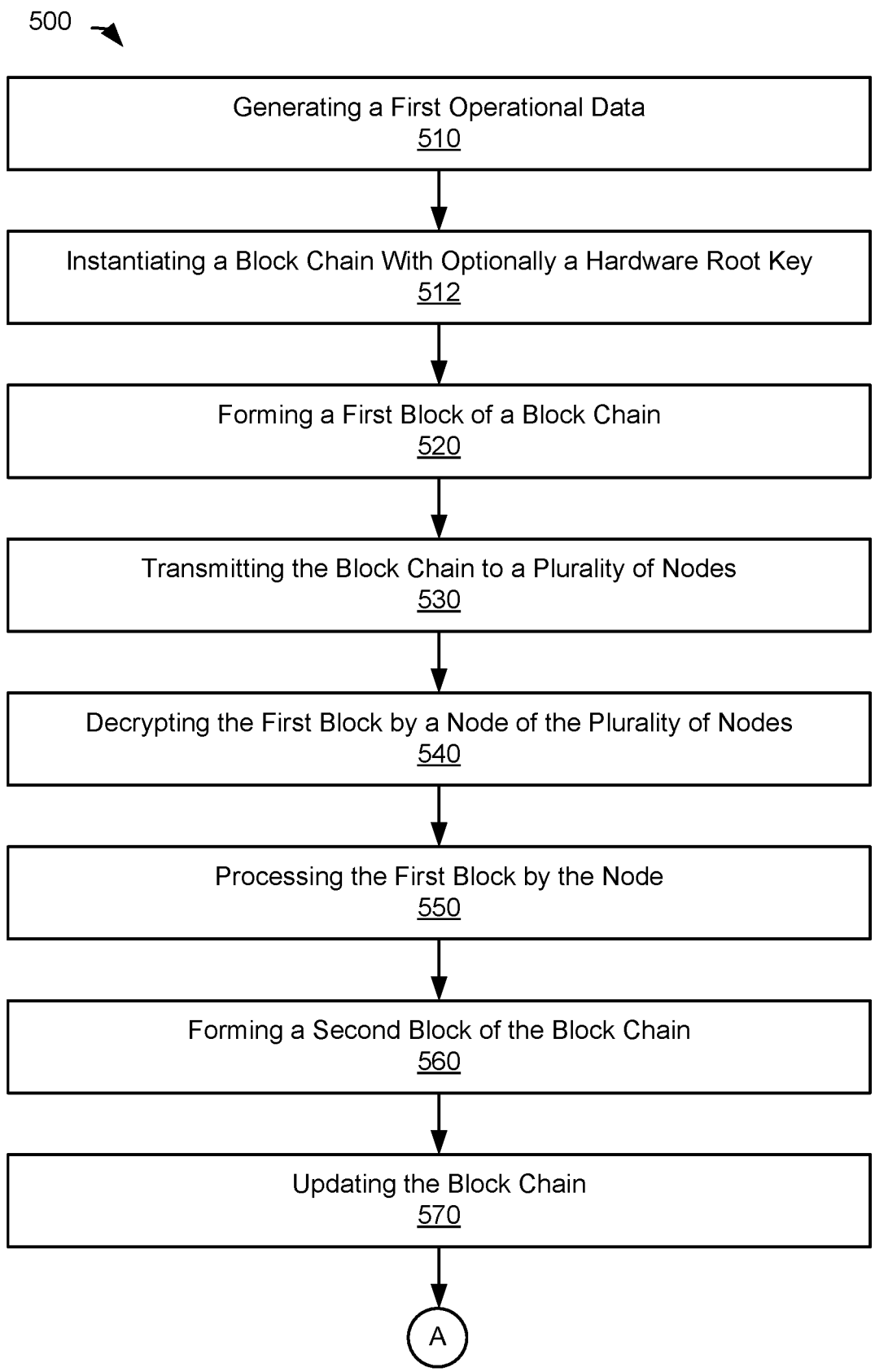
FIGS. 5A-5B show an illustrative method for communication between a storage medium enterprise system and a processing center according to one aspect of the present embodiments.
Figure 5B:
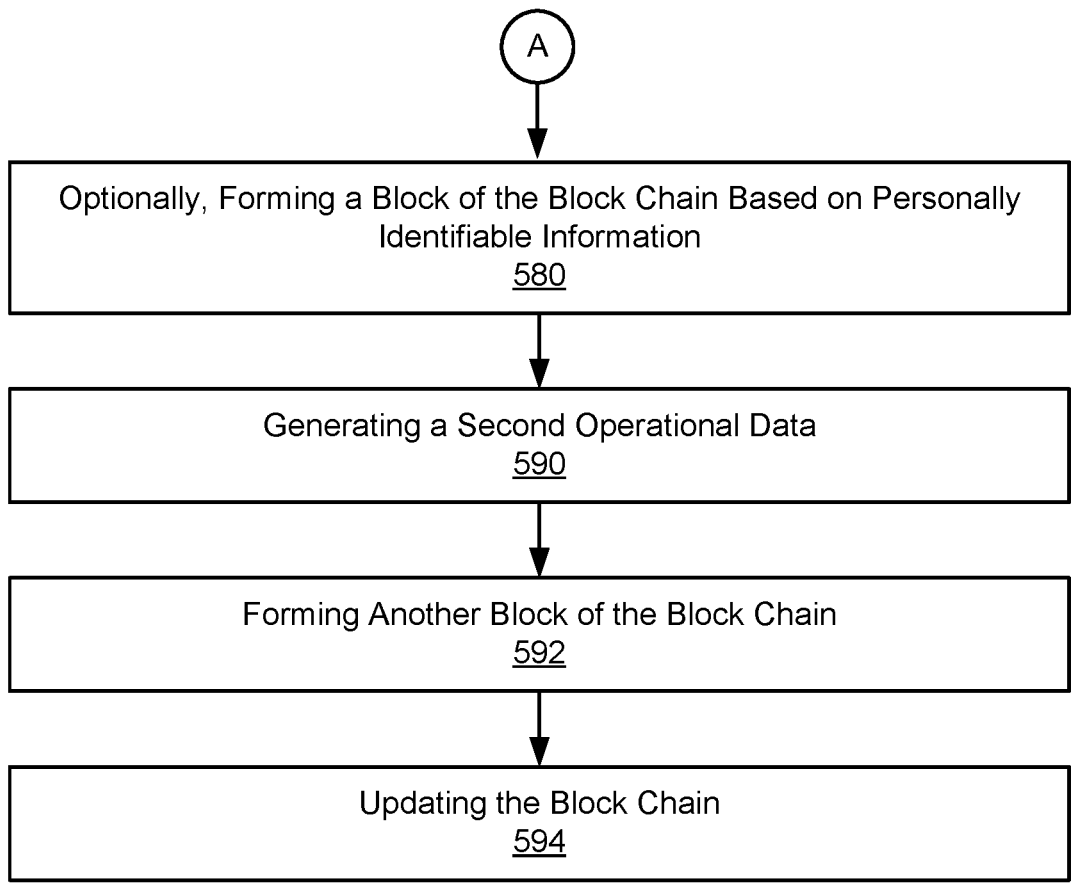

Referring now to FIGS. 5A-5B, an illustrative method 500 for communication between a storage medium enterprise system and a processing center according to one aspect of the present embodiments is shown. At step 510, a first operational data may be generated. It is appreciated that the operational data may be similar to those described above. The first operational data may be associated with the operation of the storage medium enterprise, as described above. At step 512, a block chain may be instantiated using optionally a hardware root key that may be unique to the storage medium enterprise. At step 520, a first block of the block chain may be formed, e.g., by encrypting the first operational data using the hardware root key. At step 530, the block chain may be transmitted to a plurality of nodes within the network. It is appreciated that the nodes of the plurality of nodes may include drives within the storage medium enterprise and/or processing entities. At step 540, a block, e.g., first block, of the block chain may be decrypted by a node that is authorized to do so. At step 550, the decrypted block, e.g., decrypted first operational data, may be processed and at step 560 a new block may be formed based on the processed data. For example, the processed data may be encrypted using a block chain unit to form a second block of the block chain. At step 570, the block chain may be updated with the second block, e.g., the second block may be appended to the first block. At step 580, optionally a block of the block chain may be formed based on the personally identifiable information, e.g., name, email address, media access control (MAC) address, and Internet Protocol (IP) address. At step 590, a second operational data may be generated, e.g., by a storage medium enterprise, etc. The second operational data may be formed into another block within the block chain, at step 592. At step 594, the block chain may be updated based on the another block that was formed, e.g., by appending the another block to the block chain. The updated block chain may be propagated to the nodes within the network. It is appreciated that the blocks of the block chain may be formed by encoding the data into a Merkle tree.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A system comprising:
    a storage medium enterprise comprising:
        first storage medium configured to store data; and
        a second storage medium configured to store data; and
    a processing component external to the storage medium enterprise configured to receive and process data received from the storage medium enterprise,
    wherein the first storage medium is configured to transmit a first operational data associated with the first storage medium to the processing component, and wherein the second storage medium is configured to transmit a second operational data associated with the second storage medium to the processing component,
    and wherein the first operational data is formed into a block of a block chain prior to transmission to the processing medium, and wherein the second operational data is formed into another block of the block chain prior to transmission to the processing medium.

2. The system as described in claim 1, wherein the first operational data includes personally identifiable information associated with administrator of the storage medium enterprise.

3. The system as described in claim 2, wherein the personally identifiable information is selected from a group consisting of name, email address, media access control (MAC) address, and Internet Protocol (IP) address.

4. The system as described in claim 1, wherein the first storage medium is a hard drive, and wherein the first operational data includes information associated with the hard drive and is selected from a group consisting of drive failure, a number of reads, a number of writes, utilization of the hard drive.

5. The system as described in claim 1, wherein additional operational data generated subsequent to the first operational data from the first storage medium is formed into an additional block of the block chain and transmitted to the processing medium.

6. The system as described in claim 1, wherein the block chain is instantiated with a hardware root key of the storage medium enterprise.

7. The system as described in claim 1, wherein blocks of the block chain are operational data associated with the first storage medium and the second storage medium that are hashed and encoded into a Merkle tree.

8. The system as described in claim 1 further comprising another processing component configured to receive processed data from the processing component, wherein the processed data by the processing component is formed into yet another block of the block chain prior to transmission to the another processing component.

9. The system as described in claim 1, wherein the second storage medium is a solid state drive.

10. A system comprising:
    a storage medium enterprise configured to store a first data associated with an administrator of the storage medium enterprise, wherein the storage medium enterprise is further configured to generate a second data associated with the storage medium enterprise and wherein the second data is associated with operation of the storage medium enterprise, wherein the storage medium enterprise is configured to transmit an output data that includes the first data and the second data and wherein the output data is formed into a first block of a block chain prior to its transmission;
    a first processing entity configured to receive the block chain including the first block, and wherein the first processing entity is configured to decrypt the first block of the block chain and process the output data, and wherein the first processing entity is further configured to output the processed data, wherein the processed data is formed into a second block of a block chain prior to its transmission; and
    a second processing entity configured to receive the block chain including the first block and the second block, and wherein the second processing entity is configured to decrypt the second block of the block chain and further process the processed data, and wherein the second processing entity is further configured to output the further processed data, wherein the further processed data is formed into a third block of a block chain prior to its transmission.

11. The system as described in claim 10, wherein the storage medium enterprise is further configured to generate a third data associated with the operation of the storage medium enterprise, wherein the third data is generated subsequent to forming the first block of the block chain, and wherein the third data is formed into a fourth block of the block chain prior to its transmission.

12. The system as described in claim 10, wherein the first data includes personally identifiable information associated with administrator of the storage medium enterprise and is selected from a group consisting of name, email address, media access control (MAC) address, and Internet Protocol (IP) address.

13. The system as described in claim 10, wherein the storage medium enterprise includes a hard drive, and wherein the second data includes information associated with the hard drive and is selected from a group consisting of drive failure, a number of reads, a number of writes, utilization of the hard drive.

14. The system as described in claim 10, wherein the block chain is instantiated with a hardware root key of the storage medium enterprise.

15. The system as described in claim 10, wherein blocks of the block chain are hashed and encoded into a Merkle tree.

16. The system as described in claim 10, wherein the block chain is updated across the storage medium enterprise, the first processing entity and the second processing entity subsequent to creation of each block.

17. The system as described in claim 10, wherein the storage medium enterprise includes a solid state drive.

18. A method comprising:
   generating a first operational data associated with a storage medium enterprise;
   forming a first block of a block chain based on the first operational data;
   transmitting the block chain to a plurality of nodes of the block chain, wherein the plurality of nodes includes processing entities;
   decrypting the first block of the block chain by a node of the plurality of nodes;
   processing the first block of the chain by the node of the plurality of nodes to form a first processed data;
   forming a second block of the block chain based on the first processed data; and
   updating the block chain across the plurality of nodes.

19. The method as described in claim 18 further comprising:
   instantiating the block chain with a hardware root key of the storage medium enterprise.

20. The method as described in claim 18 further comprising:
   forming a block of the block chain based on personally identifiable information associated with administrator of the storage medium enterprise selected from a group consisting of name, email address, media access control (MAC) address, and Internet Protocol (IP) address.

21. The method as described in claim 20, wherein the first operational data includes information associated with a hard drive within the storage medium enterprise and is selected from a group consisting of drive failure, a number of reads, a number of writes, utilization of the hard drive.

22. The method as described in claim 18 further comprising:
   generating a second operational data subsequent to the forming the first block of the block chain;
   forming another block of the block chain based on the second operational data to form an updated block chain; and
   updating the plurality of nodes with the updated block chain.

23. The method as described in claim 18, wherein the forming the first block and the forming of the second block each includes hashing and encoding the first operational data and the first processed data into a Merkle tree respectively.

* * * * *